(12) United States Patent
Young-Lai et al.

(10) Patent No.: US 10,291,684 B1
(45) Date of Patent: *May 14, 2019

(54) ENFORCING PUBLISHER CONTENT ITEM BLOCK REQUESTS

(71) Applicant: Google LLC, Mountain View, CA (US)

(72) Inventors: Matthew Young-Lai, Waterloo (CA); Chris Kirby, Pittsburgh, PA (US); Pavel Kobyakov, Waterloo (CA)

(73) Assignee: Google LLC, Mountain View, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 15/082,299

(22) Filed: Mar. 28, 2016

Related U.S. Application Data

(63) Continuation of application No. 13/727,894, filed on Dec. 27, 2012, now Pat. No. 9,332,291.

(51) Int. Cl.
| | |
|---|---|
| *G06Q 30/02* | (2012.01) |
| *H04L 29/06* | (2006.01) |
| *H04L 29/08* | (2006.01) |
| *H04N 21/258* | (2011.01) |

(52) U.S. Cl.
CPC ....... *H04L 67/025* (2013.01); *G06Q 30/0277* (2013.01); *H04L 67/18* (2013.01); *H04L 63/0227* (2013.01); *H04L 63/0236* (2013.01); *H04L 63/0263* (2013.01); *H04N 21/25866* (2013.01)

(58) Field of Classification Search
None
See application file for complete search history.

(56) References Cited

U.S. PATENT DOCUMENTS

| | | |
|---|---|---|
| 2006/0149623 A1 | 7/2006 | Badros et al. |
| 2011/0258049 A1 | 10/2011 | Ramer et al. |
| 2012/0016737 A1 | 1/2012 | Song et al. |
| 2012/0173345 A1 | 7/2012 | Yanefski et al. |
| 2014/0096228 A1 | 4/2014 | Weintraub et al. |
| 2014/0298445 A1 | 10/2014 | Jiang et al. |

(Continued)

FOREIGN PATENT DOCUMENTS

WO 2011/130418 10/2011

OTHER PUBLICATIONS

Thomas M. Chen and Victoria Wang, Web Filtering and Censoring (Mar. 2010), Computer (vol. 43, Issue: 3, pp. 94-97) (Year: 2010).*

(Continued)

*Primary Examiner* — Ilana L Spar
*Assistant Examiner* — Rashida R Shorter
(74) *Attorney, Agent, or Firm* — Fish & Richardson P.C.

(57) ABSTRACT

Methods, systems, and apparatus, including computer programs encoded on a computer storage medium, for enforcing publisher content item block requests. In one aspect, a method includes receiving a set of declared network locations for a content item and rendering the content item. A request is initiated for a resource that is referenced by the content item, and network locations fetched in response to the request are logged. A composite set of network locations that includes the fetched network locations and declared network locations is generated. The composite set of network locations is used to enforce publisher block requests.

24 Claims, 4 Drawing Sheets

(56) References Cited

U.S. PATENT DOCUMENTS

2014/0337963 A1 11/2014 Bhattacharyya

OTHER PUBLICATIONS

"Block an ad from an overlay". Google AdSense, Georgia Publisher Toolbar [online]. copyright 2012 [retrieved on Jul. 31, 2012]. Retrieved from Internet electronic mail: http://support.google.com/adsense/bin/answer.py?hl=en&answer=2631193, 2 pages.

* cited by examiner

ENFORCING PUBLISHER CONTENT ITEM BLOCK REQUESTS

CROSS-REFERENCE TO RELATED APPLICATIONS

This application is a continuation application of, and claims priority to, U.S. patent application Ser. No. 13/727,894, titled "Enforcing Publisher Content Item Block Requests," filed on Dec. 27, 2012. The disclosure of the foregoing application is incorporated herein by reference in its entirety for all purposes.

BACKGROUND

This specification relates to data processing and content presentation.

The Internet provides access to a wide variety of resources. For example, video and/or audio files, as well as web pages for particular subjects or particular news articles are accessible over the Internet. Access to these resources presents opportunities for content items (e.g., advertisements, audio files, or video files) to be provided with the resources. For example, a web page can include content item slots (e.g., advertisement slots) in which content items (e.g., advertisements) can be presented. These content item slots can be defined in the web page using a portion of code that causes a browser to request a content item for presentation in the web page when the browser renders the web page. A content item distribution system selects content items for presentation in response to the request. The content item distribution system can select the content items based on information included in the request and publisher specified preferences regarding the types of content items that are presented with the web page.

SUMMARY

This document describes methods and systems for automated enforcement of publisher block requests by an advertisement distribution system. A publisher block request identifies advertisements (or other content items) that the publisher has deemed ineligible for presentation with the publisher's resources, and specifies that these ineligible advertisements should be blocked from presentation with the publisher's resource. For example, assume that a publisher of an educational website would like to prevent advertisements for a particular scary movie from being presented on the website. In this example, the publisher can submit a publisher block request to the advertisement management system requesting that the advertisement for the scary movie not be presented with the publisher's web page.

Publishers can specify advertisements that are ineligible for presentation with their resource on a per-landing page basis. For example, to block an advertisement from a particular advertiser, the publisher can identify a landing page to which the advertisement redirects users and request that any advertisement having a landing page matching the identified landing page be blocked from presentation on the publisher's resource. In turn, the advertisement management system can compare a network address of the identified landing page with network addresses of landing pages with which available advertisements are associated, and prevent advertisements that redirect users to the identified landing page from being presented with the publisher's resource.

In some implementations, the advertisement management system can prevent presentation of a content item, such as an advertisement, by not selecting the content item for presentation, classifying the content item as ineligible for presentation, or not transmitting the content item to a user device in response to the content item request, e.g., following selection of the content item based on information included in the content item request.

Generally, the enforcement of publisher block requests is performed by comparing the network address of the landing page specified in the publisher block request to the network address of declared landing pages that advertisers have specified as landing pages for their advertisements. For example, an advertiser for a scary movie can provide the advertisement management system with data specifying a particular URL as the landing page for the advertisement for the scary movie. In this example, if the URL for the landing page specified in the publisher block request matches the particular URL provided by the advertiser, the advertisement management system can prevent the advertisement for the scary movie from being presented with the educational website.

In some situations, a particular advertisement may be associated with multiple different landing pages. For example, an advertiser can create an advertisement that redirects users from Georgia to one particular landing page and redirects users from California to another landing page. The landing page to which a particular advertisement redirects users may also change over time (e.g., to promote seasonal or sale items) and/or redirect users to a first landing page that then redirects the user to a second landing page.

To facilitate enforcement of publisher block requests, the landing pages that are associated with a particular advertisement can be the declared landing pages that the advertiser has specified as well as additional landing pages to which the particular advertisement redirects users. In some implementations, the additional landing pages can be identified by a virtual machine (or another data processing apparatus) that simulates an interaction with an advertisement (or another content item) and records each network location (e.g., URL) to which the virtual machine is redirected in response to the simulated click. The recorded network locations can be combined with the list of declared network locations, and this combined set of network locations can be used to enforce publisher block requests. For example, if the combined set of network locations includes a network location that matches a network location included in a publisher block request, the advertisement associated with the combined set of network locations will not be eligible for presentation.

In general, one innovative aspect of the subject matter described in this specification can be embodied in methods that include the actions of receiving a set of declared network locations for a content item, the set of declared network locations being a set of network locations specified by a content item provider as network locations that are requested in response to user interaction with the content item; rendering the content item; initiating, through interaction with the content item, a request for a resource that is referenced by the content item; logging, as fetched network locations for the content item, each network location that is fetched in response to the interaction with the content item; filtering the fetched network locations to remove fetched network locations that match a service location from a set of known service locations; and generating, for the content item, a composite set of network locations that includes the fetched network locations and set of declared network locations. Other embodiments of this aspect include corresponding systems, apparatus, and computer programs, configured to perform the actions of the methods, encoded on computer storage devices.

These and other embodiments can each optionally include one or more of the following features. Methods can include the actions of determining that a network location in the composite set of network locations matches a blocked network location for a publisher; and preventing presentation of the content item with a resource for the publisher.

Methods can include the actions of determining that fewer than a threshold number of the fetched network locations match a network location in the declared network locations; and preventing, in response to determining that fewer than a threshold number of the fetched network locations match a network location in the declared network locations, presentation of the content item with publisher resources.

Methods can include the actions of determining that at least a threshold number of the fetched network locations are not included in the declared network locations; and preventing, in response to determining that at least a threshold number of the fetched network locations are not included in the declared network locations, presentation of the content item with publisher resources.

Methods can include the actions of obtaining, from a browser address field, a last fetched network address for the content item, the last fetched network address being a network address for a final resource that was requested in response to interaction with the content item; and identifying a resource at the last fetched network address as a destination resource for the content item.

Methods can include the actions of logging a time at which the network locations in the set of fetched network locations were fetched; and determining a last fetched network location for the content item based on the logged times.

Methods can include the actions of determining that the last fetched network location for the content item does not match a network location in the set of declared network locations; and preventing presentation of the content item in response to determining that the last fetched network location does not match a network location in the set of declared network locations.

Methods can include the actions of determining for a particular network location that content items provided by at least a threshold number of content item providers redirect users to the particular network location; and identifying the particular network location as a service location for a service site in response to determining that the content item provider by the threshold number of content item providers redirect users to the particular network location.

Particular embodiments of the subject matter described in this specification can be implemented so as to realize one or more of the following advantages. Publisher block requests can be enforced without requiring content item providers to specify landing pages to which their content items redirect users. Content item provider compliance with terms of service can be evaluated by comparing a content item provider's declared landing pages with the logged network locations to which their content items redirect users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
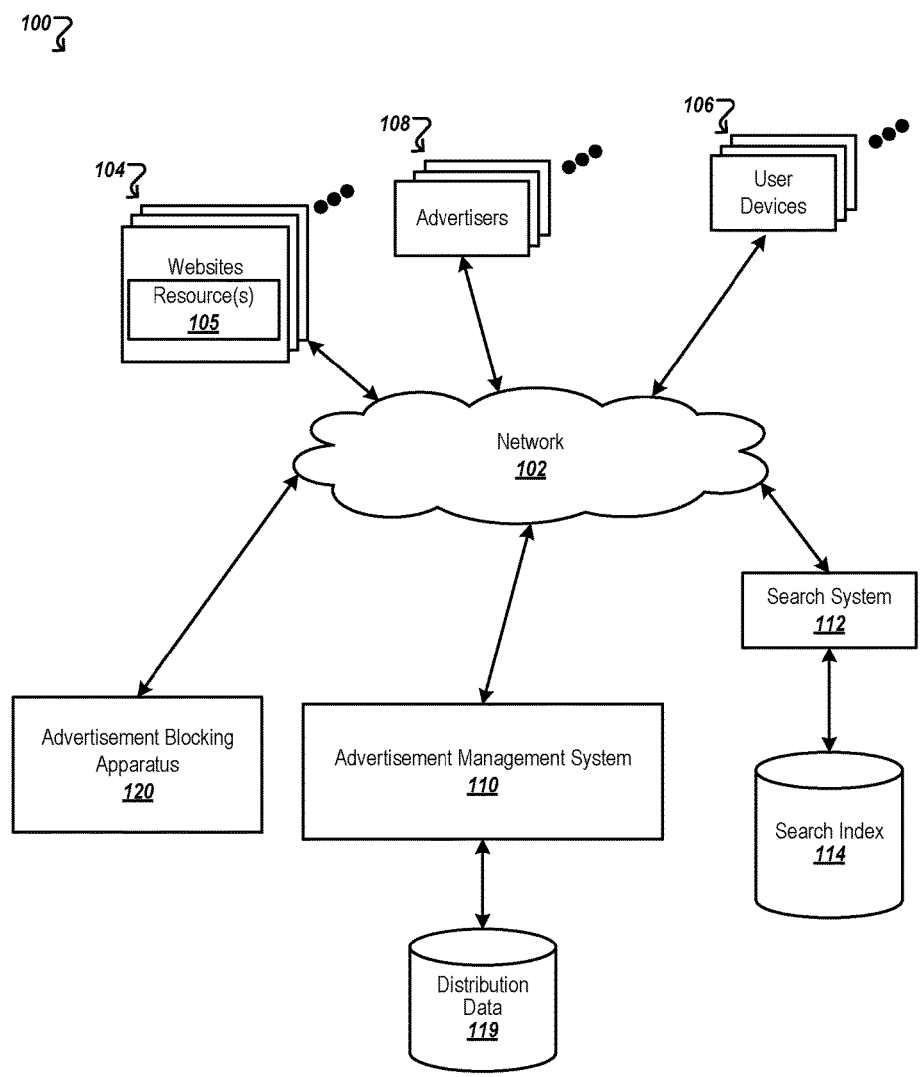
FIG. 1 is a block diagram of an example environment in which content items are distributed to user devices.

FIG. 1 is a block diagram of an example environment 100 in which content items are distributed to user devices. A content item is a discrete unit of data that can be presented with a resource. For example, a content item can be a file that is provided for insertion in a portion of a resource that is presented at a user device.

The environment 100 includes an advertisement management system 110 that manages advertising services. The example environment 100 also includes a network 102, such as a local area network (LAN), a wide area network (WAN), the Internet, or a combination thereof. The network 102 connects websites 104, user devices 106, advertisers 108, and the advertisement management system 110. The example environment 100 may include any number of websites 104, user devices 106, and advertisers 108. FIG. 1 is discussed with reference to advertisements being distributed to user devices, but other types of content items (e.g., audio files, video files, or other files) can be distributed in the environment as well.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display in which advertisements can be presented. These specified portions of the resource or user display are referred to as content item slots or advertisement slots.

When a resource 105 is requested by a user device 106, the advertisement management system 110 receives a request for advertisements to be provided with the resource 105. The request for advertisements can include characteristics of the advertisement slots that are defined for the requested resource, and can be provided to the advertisement management system 110. For example, a reference (e.g., URL) to the resource (e.g., a retailer's web page or a web page for a sports network) for which the advertisement slot is defined, a size of the advertisement slot, and/or media types that are authorized for presentation in the advertisement slot can be provided to the advertisement management system 110. Similarly, keywords associated with a requested resource ("resource keywords") can also be provided to the advertisement management system 110 to facilitate identification of advertisements that are relevant to the resource.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords. In some implementations, advertisements having targeting keywords that match the resource keywords are selected as eligible advertisements by the advertisement management system 110.

The environment 100 includes a distribution data store 119 that stores data with which the advertisement management system 110 (or another content item distribution system) selects advertisements (or other content items) for presentation with a resource. The distribution data store 119 can include, for example, distribution parameters, such as distribution keywords and/or bids with which distribution of the advertisements is controlled. For example, an advertisement that is associated with a particular set of keywords may only be eligible for distribution when an advertisement request including a resource keyword that matches the distribution keyword is received.

The distribution data store 119 can also store, for each advertisement, a list of declared landing pages. The list of declared landing pages can be provided by the advertiser and specify one or more network locations to which the advertisement redirects users. For example, if a particular advertisement redirects all users to a same landing page, the advertiser for the particular advertisement may only include the single URL for the landing page in the list of declared landing pages. However, if the landing page to which an advertisement redirects users varies on a per-user-group basis or over time, the advertiser may include each of the URLs for the various landing pages in the list of declared landing pages for the advertisement.

As noted above, the eligibility of a particular advertisement for presentation with a particular resource can be based, at least in part, on publisher block requests that have been specified by the publisher of the particular resource. For example, a publisher of an educational web site may not want advertisements for a scary movie to be presented with pages from the educational web site. In this example, the publisher can submit to the advertisement management system 110 a publisher block request specifying a network location (e.g., a page URL or a top level domain) of a web page for the scary movie. When advertisements are selected for presentation with pages from the educational web site, the advertisement management system 110 can compare the network location specified in the publisher block request with the list of declared landing pages for the available advertisements. If the advertisement management system 110 detects a match between a network location from the publisher block request and the list of declared landing pages for an advertisement, the advertisement management system 110 can prevent that advertisement from being selected for presentation.

As noted above, a particular advertisement may be associated with multiple different landing pages. For example, an advertiser can create an advertisement that redirects users from Georgia to one particular landing page and redirects users from California to another landing page. The landing page to which a particular advertisement redirects users may also change over time (e.g., to promote seasonal or sale items) and/or redirect users to a first landing page that then redirects the user to a second landing page. In each of these examples, if an advertiser does not declare each of the multiple different landing pages that are associated with the advertisement (e.g., in the list of declared landing pages), it is possible that the publisher block request will not be enforced.

The environment 100 includes a landing page apparatus 120 that facilitates enforcement of publisher block requests, even if an advertiser has failed to declare one or more landing pages to which an advertisement redirects users. As illustrated in FIG. 1, the landing page apparatus 120 is in data communication with the advertisement management system 110. In some implementations, the landing page apparatus 120 can be implemented as part of the advertisement management system 110.

The landing page apparatus 120 is a data processing apparatus that identifies and logs landing pages to which advertisements redirect users. For example, as discussed in more detail below, the landing page apparatus 120 can render an advertisement (or another content item), and initiate a request (e.g., by simulating a user click) for a landing page (or another resource) that is referenced by the advertisement. In turn, the landing page apparatus 120 can log each network location that is fetched or otherwise requested following the initial request. For example, if following the initial request, the landing page apparatus 120 is redirected to multiple different network locations, the landing page apparatus 120 can log each of these network locations as fetched network locations for the advertisement. As described in more detail below, the advertisement management system 110 can then use the fetched network locations for enforcing publisher block requests.

Figure 2:
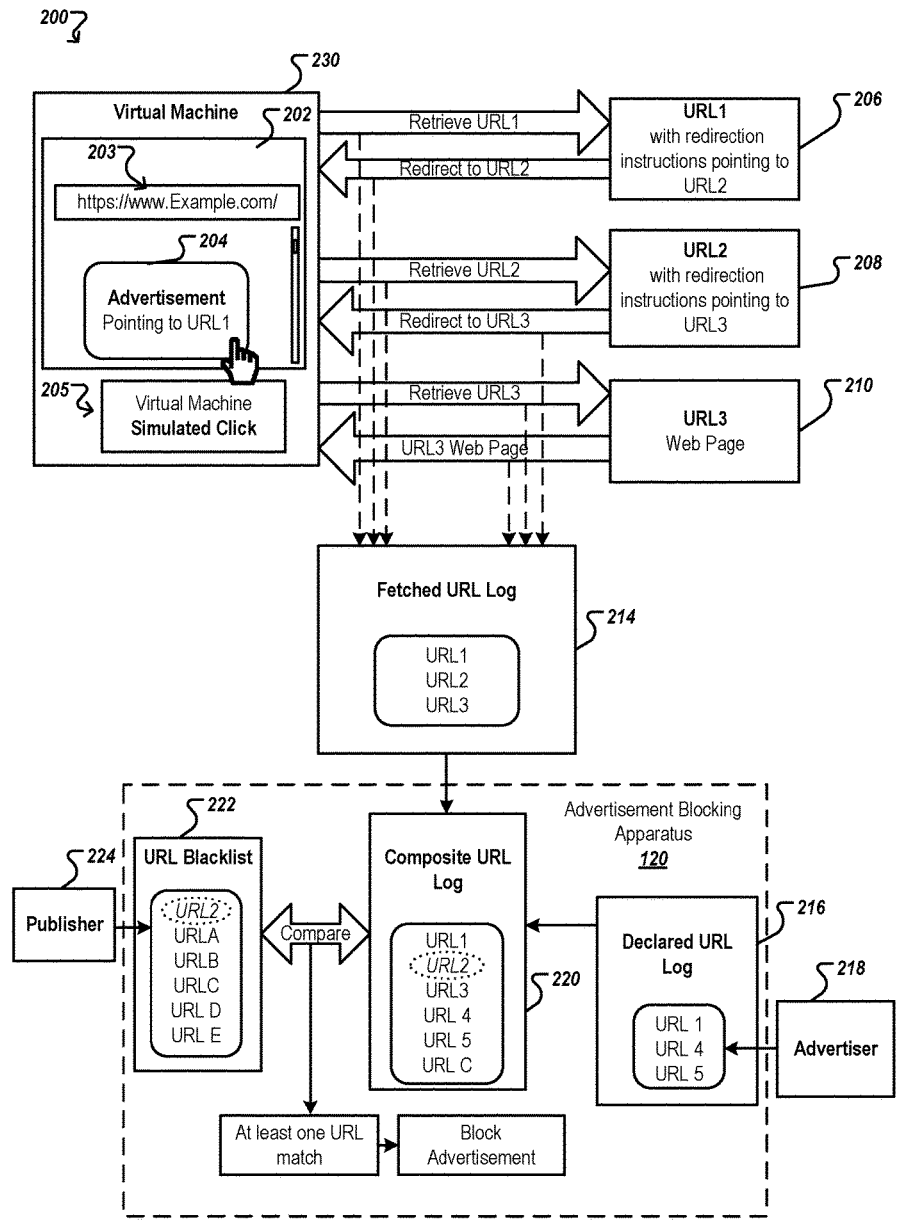
FIG. 2 is a block diagram of an example data flow for enforcing publisher block requests.

FIG. 2 is a block diagram of an example data flow 200 for enforcing publisher block requests. The example data flow 200 begins with an advertisement 204 being rendered, in a virtual machine 230. For example, the virtual machine 230 can obtain the advertisement 204 from a database of advertisements that are distributed by the advertisement management system 110 of FIG. 1, and render the advertisement 204 in a browser application 202.

The data flow 200 continues with the virtual machine 230 initiating an interaction with the advertisement 204. For example, as shown in FIG. 2, the virtual machine 230 can generate a simulated user click 205 of the advertisement 204. The simulated user click 205 causes the browser application 202 to request a resource from a network location that is referenced by the advertisement 204. For example, as illustrated by FIG. 2, the browser application 202 initiates a request for a resource located at URL1 206, which is referenced by advertisement 204. In response to determining that interaction with the advertisement 204 initiates a request for the resource at URL1 206, the virtual machine 230 logs URL1 206 as a fetched network location for the advertisement 204. Throughout this document, network locations that are requested in response to interaction with a content item (e.g., an advertisement) are referred to as fetched network locations.

The data flow 200 continues with the virtual machine 230 receiving, in response to the request for URL1 206, redirect instructions that cause the browser application 202 to request a resource from URL2 208. In turn, the virtual machine 230 logs URL2 208 as a fetched network location for the advertisement 204, such that URL1 206 and URL2 208 are both included in Fetched URL Log 214 that stores fetched network locations for the advertisement 204.

As illustrated by FIG. 2, URL2 208 includes redirect instructions that cause the browser application 202 to request a resource from URL3 210. In response to determining that the browser application 202 is redirected to URL3 210, the virtual machine 230 includes URL3 210 in the Fetched URL Log 214 for the advertisement 204. Thus, following the request for URL3 210, the Fetched URL Log 214 for the advertisement 204 contains URL1, URL2, and URL3.

If additional redirects occur, the virtual machine 230 can continue to log the requested URLs in the Fetched URL Log 214 in a manner similar to that described above. When the virtual machine 230 determines that further redirect instructions have not been received, the virtual machine can identify the network locations in the Fetched URL Log 214 as the fetched network locations for the advertisement 204.

As noted above, an advertisement management system (or another content distribution system) can require advertisers (or other content item providers) to specify a set of declared network locations (e.g., URLs) for each advertisement (or content item) provided by the advertisers (or content item providers). For example, an advertiser 218 can be requested to specify a set of declared network locations 216 to which advertisement 204 redirects users. In response to the request, advertiser 218 may specify that the advertisement 204 redirects users to URL1, URL4, and URL5, but fail to specify that the advertisement 204 can also redirect users to URL2 and URL3. Thus, if a publisher submits a publisher block request specifying that advertisements redirecting users to URL2 be blocked from presentation with resources provided by the publisher, the advertisement 204 may still be presented with the publisher's resources if only the set of declared landing pages 216 is used to enforce the publisher block request.

The data flow 200 continues with the advertisement blocking apparatus 120 (or another data processing apparatus) combining the Declared URL Log 216 with the Fetched URL Log 214 to create a Composite URL Log 220. The Composite URL Log 220 is a composite set of network locations to which the advertisement 204 has been determined to redirect users. As described below, the Composite URL Log 220 can be filtered to remove redundant network locations and/or network locations for particular resources (e.g., trusted resources). Since the Composite URL Log 220 includes both declared network locations and fetched network locations, the Composite URL Log 220 facilitate enforcement of publisher block requests even when an advertiser fails to include, in the set of declared landing pages 216, all of the network locations to which the advertisement 204 redirects users.

For example, assume that publisher 224 submits a publisher block request to the advertisement blocking apparatus 120 requesting that advertisements associated with a specified set of Blacklisted URLs 222 not be presented with resources provided by the publisher 224. As illustrated by FIG. 2, the set of Blacklisted URLs 222 includes URL2, URLA, URLB, URLC, URLD, and URLE. Thus, in this example, the publisher 224 has requested that advertisements redirecting users to resources located at any of URL2, URLA, URLB, URLC, URLD, or URLE not be presented with resources provided by the publisher 224.

Continuing with this example, the advertisement blocking apparatus 120 compares the set of Blacklisted URLs 222 to the Composite URL Log 220 (e.g., when a resource provided by the publisher 224 initiates an advertisement request) to determine whether the advertisement 204 is eligible for presentation with resources provided by the publisher 224. If a network location included in the set of Blacklisted URLs 222 matches a network location specified by the Composite URL Log 220, the advertisement blocking apparatus 120 will deem the advertisement 204 not be eligible for presentation with resources provided by the publisher 224. If no match exists between the network locations included in the set of Blacklisted URLs 222 and the Composite URL Log 220, the advertisement 204 will not be blocked based on the publisher block request.

As illustrated by FIG. 2, the set of Blacklisted URLs 222 includes URL2, which is also included in the Composite URL Log 220. Therefore, in this example, the advertisement blocking apparatus 120 will deem the advertisement 204 ineligible for presentation with resources provided by the publisher 224. In this example, an exact match exists between a URL in the set of Blacklisted URLs 222 and a URL in the Composite URL Log 220. In some implementations, matching network locations (e.g., URLs) need not be exactly the same. For example, a match between network locations can be identified when the network locations share a same domain. To illustrate, assume that the set of Blacklisted URLs 222 includes the path www.example.com/scary-movie, and the Composite URL Log includes the path www.example.com/scarymoviepreview. In this example, the two URLs can be deemed to match since they both reference the domain example.com.

As noted above, the Composite URL Log 220 and/or the Fetched URL Log 214 can be filtered, such that a proper subset of the fetched network locations from the Fetched URL Log 214 are included in the Composite URL Log 220. In some implementations, the advertisement blocking apparatus 120 may filter the Composite URL Log 220 to remove duplicate network locations. For example, URL1 is included in each of the Declared URL Log 216 and the Fetched URL Log 214, such that, absent filtering, two instances of URL1 may be included in the Composite URL Log 220. Thus, the advertisement blocking apparatus 120 can filter the Composite URL Log 220 to remove duplicate instances of URLs.

In some implementations, the Composite URL Log 220 (or the Fetched URL Log 214) can be filtered to remove network locations for service sites. Service sites provide services to advertisers. For example, a service site may track the performance of advertisements provided by a particular advertiser, and provide analytics associated with the advertisements. The services provided by a service site may require users that interact with an advertisement to be redirected to a URL for the service site in order to track user interactions with the advertisement. Thus, the URL for the service site may be included in the Fetched URL Log 214. As described in more detail with reference to FIG. 3, including a network location or a URL associated with a service site may cause the advertisement to be deemed ineligible for presentation. Therefore, removing network locations for service sites from the Composite URL Log 220 can reduce the likelihood that an advertisement is incorrectly identified as ineligible for presentation.

In some implementations, service sites can be identified from a list of known service sites. For example, URLs for a set of known service sites can be referenced and URLs in the Composite URL Log 220 that match the URLs for the known set of service sites can be removed from the Composite URL Log 220. Additionally, or alternatively, a URL that is included in the Fetched URL Log 214 for at least a threshold number of advertisers can be identified as a service site URL, and removed from the Composite URL Log 220.

Additionally, in some embodiments the advertisement blocking apparatus 120 may also block all other advertisements provided by an advertiser that provided the blocked advertisement. For example, with respect to the example shown in FIG. 2, all advertisement provided by advertiser 218, may also be blocked in response to the advertisement 204 being blocked. In other embodiments, the advertisement blocking apparatus 120 may block all advertisements associated with the same domain name as the domain name of the blocked advertisement.

Figure 3:
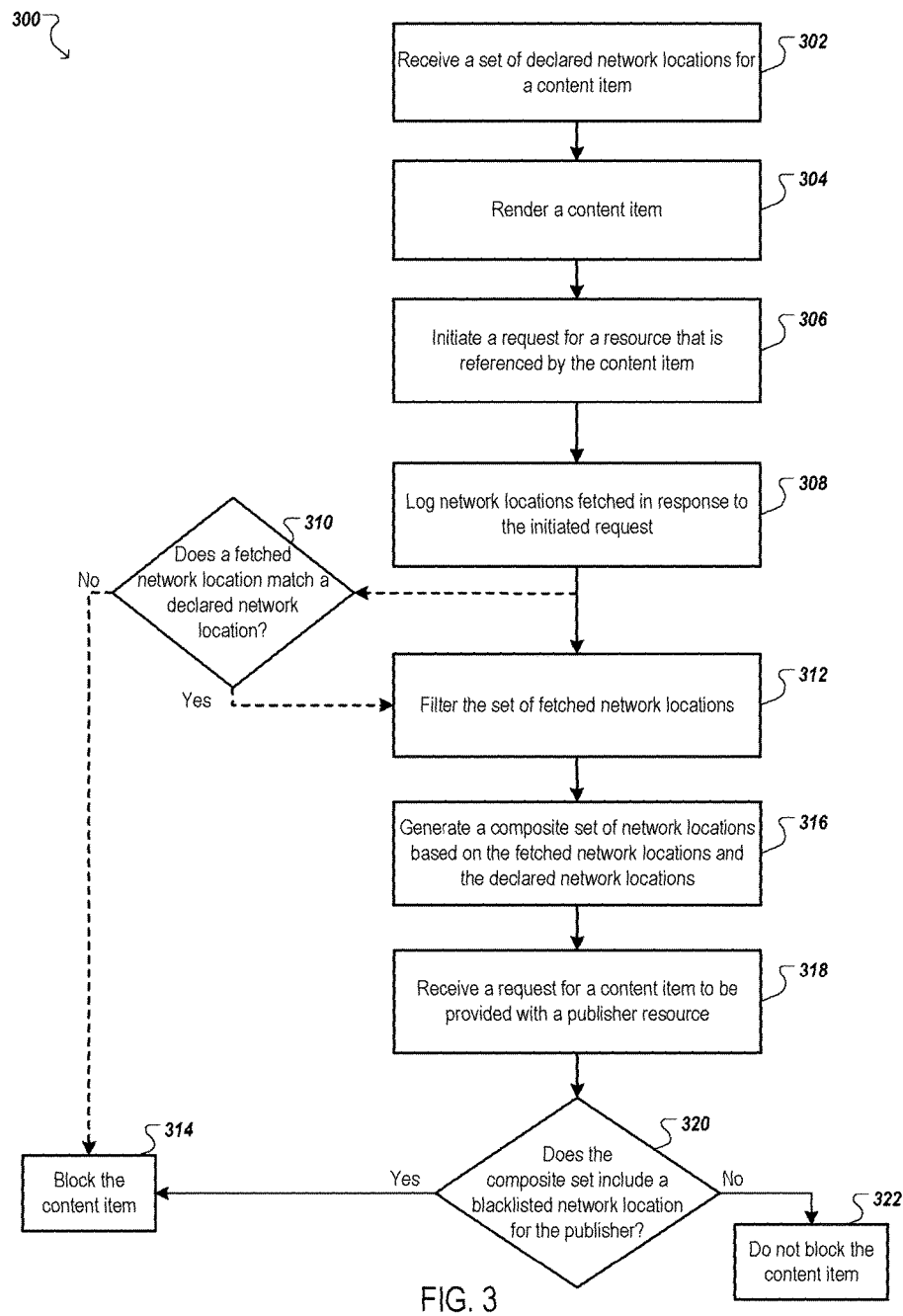
FIG. 3 is a flow chart of an example process for enforcing publisher block requests.

FIG. 3 is a flow chart of an example process 300 for enforcing publisher block requests based on a composite set of network locations. Operations of the process 300 can be implemented by a data processing apparatus, such as the advertisement blocking apparatus 120 and/or advertisement management system 110 of FIG. 1. The process can also be implemented as instructions stored on a non-transitory computer storage medium such that execution of the instructions by a data processing apparatus causes the data processing apparatus to perform operations of the process 300.

A set of declared network locations are received for a content item (302). In some implementations, the set of declared network locations are a set of network locations that, according to a provider of the content item, are requested in response to interaction with the content item. For example, as described above with reference to FIG. 2, an advertisement management system can request (or require) an advertiser to specify at least one network location to which the advertiser's advertisements redirect users. The network locations (e.g., URLs) specified by the advertiser can be associated with the advertisement as declared network locations, also referred to as declared landing pages, for the advertisement. The set of declared network locations can be stored in a data store, such as the distribution data store 119 of FIG. 1.

A content item is rendered (304). The content item may be rendered by a data processing apparatus, such as the advertisement management system 110 or the advertisement blocking apparatus 120 of FIG. 1. In some implementations, the content item is rendered by a virtual machine that emulates a browser at a user device. A request for a resource that is referenced by the content item is initiated (306). In some implementations, the request for the resource is initiated by simulating a user interaction with (e.g., a click of) the content item. The user interaction can be simulated, for example, by a virtual machine that is implemented in the advertisement management system 110 and/or the advertisement blocking apparatus 120.

In some implementations, the request for the resource that is referenced by the content item can be initiated without simulating a user interaction with the content item. For example, a data processing apparatus can identify a network location to which the content item redirects users in response to interaction with the content item and submit a request for data stored at that network location.

Network locations fetched in response to the initiated request ("fetched network locations") are logged (308). In some implementations, the fetched network locations include each network location that is requested following interaction with the content item. For example, as described above with reference to FIG. 2, redirect instructions may be received in response to a request for a network location that is referenced by a content item. In this example, the originally requested network location and any additional network locations to which a user device is redirected following interaction with the content item can be logged as fetched network locations for the content item.

In some implementations, the fetched network locations may be copied from (or otherwise obtained from) an address bar of a browser that is used to request the network locations. For example, each request for a network location may result in the network location being placed in the address bar, such that each network location can be copied to a fetched network location log (e.g., fetched URL log) from the addressed bar.

In some implementations, only a proper subset of the fetched network locations is identified from the address bar. For example, a destination network location for a destination resource (e.g., a destination web page) can be obtained using the address bar, while other network locations that are requested can be obtained, for example, from the redirect instructions and/or the requests for resources at the network locations.

A destination resource is a final resource requested based on the interaction with the content item. For example, with reference to FIG. 2, the virtual machine 230 is provided a web page associated with URL3, rather than redirect instructions, in response to requesting data from URL3. Since no further redirect occurs following the URL3 request, the web page received by the virtual machine 230 can be considered a destination page for the advertisement 204, and URL3 can be considered a destination network location for the advertisement 204.

In some implementations, the destination network location can be identified based on times at which the network locations were requested. For example, with reference to FIG. 2, the request for URL1 will occur prior to the request for URL2, which will occur prior to the request for URL3. Therefore, the virtual machine can timestamp (or otherwise log a time for) each request and use the timestamps to determine a destination network location for an advertisement. For example, with respect to a particular interaction with the content item, the network address that is associated with a most recent timestamp will be the last requested network address and can be identified as the destination network location for the advertisement.

In some implementations, a determination is made whether a fetched network address for the content item matches a declared network location for the content item is optionally performed (310). The determination can be made for example, by comparing the set of fetched network locations for the content item to the set of declared network locations for the content item. If, based on the comparison, a match is identified, the set of fetched network locations can be filtered (312). If, based on the comparison, a match is not identified, the content item can be blocked from presentation with publisher resources (314).

Blocking a content item based on a lack of a match between a fetched network location and a declared network location can prevent distribution of content items for content item providers who are not complying with terms of service (e.g., terms imposed the advertisement management system 110 of FIG. 1). For example, assume that an advertisement management system requires content item providers to specify network locations to which users are redirected in response to interaction with content items provided by the content item providers. In this example, an advertiser that fails to specify any of the fetched network locations is in violation of the terms of service, and their content items may not be distributed. Additionally, or alternatively, the content item can be blocked when fewer than a threshold number of the fetched network locations are included in the declared network locations.

In some implementations, a content item is blocked when more than a threshold number of the fetched network locations fail to match the declared network locations. Using a threshold number of fetched network locations can prevent a content item from being blocked when an advertiser inadvertently fails to specify one of the fetched network locations as a declared network location.

In some implementations, a content item is blocked from presentation (e.g., prevented from being presented with publisher resources), when the destination network location for the content item is not included in the declared network locations for the content item. For example, as long as the destination network location for the content item is included in the declared network locations, the content item will not be blocked due to one or more of the fetched network locations that are fetched prior to the destination network location not being included in the declared network locations. However, if the destination network location (e.g., the last fetched network location for the content item) does not match a network location in the set of declared network locations for the content item, the content item can be prevented from being presented with publisher resources. Note that the determination performed at 308 can be performed following the filtering operations discussed below.

In some implementations, the advertisement management system can prevent presentation of a content item, such as an advertisement, by not selecting the content item for presentation, classifying the content item as ineligible for presentation, or not transmitting the content item to a user device in response to the content item request, e.g., following selection of the content item based on information included in the content item request.

The set of fetched network locations is filtered (312). As described above with reference to FIG. 2, the set of fetched network locations can be filtered to remove network locations for service sites that provide services to advertisers. In some implementations, the filtering is performed on the set of fetched network locations prior to generation of the composite set of network locations. In some implementations, the filtering is performed following generation of the composite set of network locations. If filtering is performed following the generation of the composite set of network locations, any duplicate network locations (e.g., network locations that are included in both the fetched network locations and the declared network locations) can be can be removed from the composite set of network locations.

A composite set of network locations is generated based on the set of fetched network locations and the set of declared network locations for the content item (316). As described with reference to FIG. 2, the composite set of network locations can be generated by combining the filtered set of fetched network locations with the set of declared network locations specified by the advertiser.

A request for a content item to be presented with a publisher resource is received (318). The request can be received, for example, in response to a user device requesting presentation of the publisher resource. The request can identify the publisher resource, for example, by including a network location of the publisher resource.

A determination is made whether the composite set of network locations for the content item matches a blacklisted network location for the publisher (320). As described above with reference to FIG. 2, a match can be determined to exist when a blacklisted network location and a network location in the composite set match exactly, or when a partial match (e.g., a domain level match) is determined to exist. When a match is identified, the content item is blocked (314). When a match is not found the advertisement is not blocked based on the blacklisted network locations for the publisher (322).

In some embodiments, the publisher may request that all content items from a particular content item provider be blocked. For example, upon identifying a resource to which a particular advertisement for tobacco products link, a publisher may specify that any advertisements from the advertiser that provided the advertisement be blocked from presentation with resources provided by the publisher. In this example, the advertisement blocking apparatus 120 and/or the advertisement management system 110 can identify, as ineligible advertisements for presentation with the publisher's resources, all advertisements that were provided by the advertiser that provided the particular advertisement.

Figure 4:
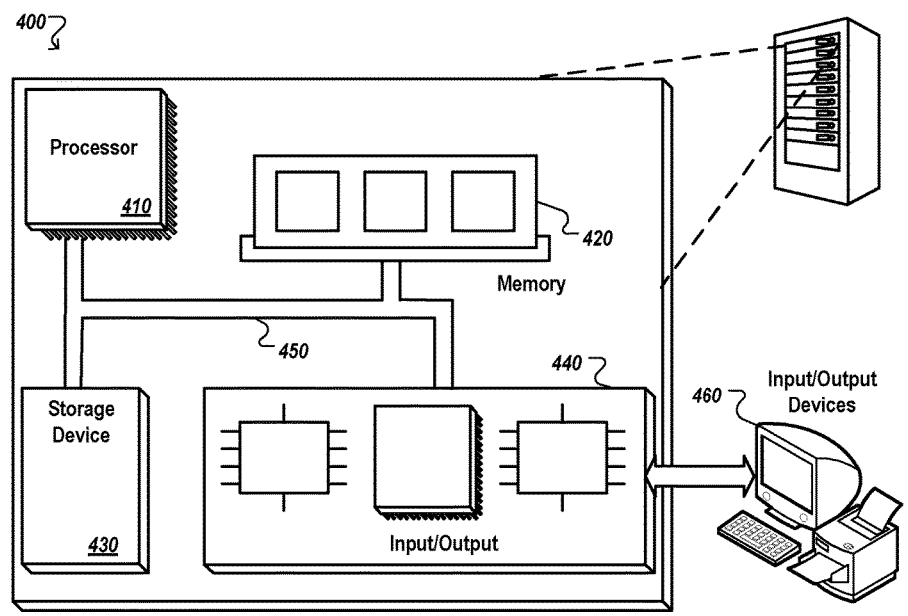
FIG. 4 is block diagram of an example computer system.

FIG. 4 is block diagram of an example computer system 700 that can be used to perform operations described throughout this document. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, from a content item provider, a set of declared network locations that the content item provider specifies are requested by a user device in response to user interaction with a content item;
   simulating, at a server system including one or more processing devices, a user interaction with the content item including:
      rendering, at the server system, the content item; and
      initiating, through interaction with the content item by the server system, a request for a destination page that is linked to by the content item;
   detecting one or more uniform resource locators (URLs) of servers that are contacted after the interaction with the content item, but before a landing page is retrieved by the server system;
   generating, for the content item and by the server system, a composite set of network locations that includes network locations of the one or more detected URLs and the set of declared network locations specified by the content item provider wherein at least one of the network locations of the one or more detected URLs differs from the set of declared network locations;
   comparing the composite set of network locations to a set of blacklisted network locations provided by a publisher that differs from the content item provider; and
   preventing the content item from being presented with a web document provided by the publisher when a network location in the composite set of network locations matches a network location in the set of blacklisted network locations.

2. The method of claim 1, wherein preventing presentation of the content item comprises not transmitting the content item in response to a content item request.

3. The method of claim 1, further comprising:
   determining that fewer than a threshold number of the detected URLs match a network location in the declared network locations; and
   preventing, in response to determining that fewer than a threshold number of the detected URLs match a network location in the declared network locations, presentation of the content item with publisher resources.

4. The method of claim 1, further comprising:
   determining that at least a threshold number of the detected URLs are not included in the declared network locations; and
   preventing, in response to determining that at least a threshold number of the detected URLs are not included in the declared network locations, presentation of the content item with publisher resources.

5. The method of claim 1, further comprising:
   obtaining, from a browser address field, a last requested network address for the content item, the last requested network address being a network address for a final resource that was requested in response to interaction with the content item; and
   identifying a resource at the last requested network address as a destination resource for the content item.

6. The method of claim 1, further comprising:
   logging a time at which the network locations in the one or more detected URLs were requested; and
   determining a last requested network location for the content item based on the logged times.

7. The method of claim 6, further comprising:
   determining that the last requested network location for the content item does not match a network location in the set of declared network locations; and
   preventing presentation of the content item in response to determining that the last requested network location does not match a network location in the set of declared network locations.

8. The method of claim 1, further comprising:
   determining for a particular network location that content items provided by at least a threshold number of content item providers redirect users to the particular network location; and
   identifying the particular network location as a service location for a service site in response to determining that the content item provider by the threshold number of content item providers redirect users to the particular network location.

9. A system, comprising:
   a data processing apparatus; and
   a data store storing instructions executable by the data processing apparatus and that cause the data processing apparatus to perform operations comprising:
      receive, from a content item provider, a set of declared network locations that the content item provider specifies are requested by a user device in response to user interaction with a content item;

simulate a user interaction with the content item including:
- render the content item; and
- initiate, through interaction with the content item by the data processing apparatus, a request for a destination page that is linked to by the content item;

detect one or more uniform resource locators (URLs) of servers that are contacted after the interaction with the content item, but before a landing page is retrieved by the data processing apparatus;

generate, for the content item, a composite set of network locations that includes network locations of the one or more detected URLs and the set of declared network locations specified by the content item provider wherein at least one of the network locations of the one or more detected URLs differs from the set of declared network locations;

compare the composite set of network locations to a set of blacklisted network locations provided by a publisher that differs from the content item provider; and prevent the content item from being presented with a web document provided by the publisher when a network location in the composite set of network locations matches a network location in the set of blacklisted network locations.

10. The system of claim 9, wherein preventing presentation of the content item comprises not transmitting the content item in response to a content item request.

11. The system of claim 9, wherein the instructions cause the data processing apparatus to perform operations further comprising:
- determining that fewer than a threshold number of the detected URLs match a network location in the declared network locations; and
- preventing, in response to determining that fewer than a threshold number of the detected URLs match a network location in the declared network locations, presentation of the content item with publisher resources.

12. The system of claim 9, wherein the instructions cause the data processing apparatus to perform operations further comprising:
- determining that at least a threshold number of the detected URLs are not included in the declared network locations; and
- preventing, in response to determining that at least a threshold number of the detected URLs are not included in the declared network locations, presentation of the content item with publisher resources.

13. The system of claim 9, wherein the instructions cause the data processing apparatus to perform operations further comprising:
- obtaining, from a browser address field, a last requested network address for the content item, the last requested network address being a network address for a final resource that was requested in response to interaction with the content item; and
- identifying a resource at the last requested network address as a destination resource for the content item.

14. The system of claim 9, wherein the instructions cause the data processing apparatus to perform operations further comprising:
- logging a time at which the network locations in the one or more detected URLs were requested; and
- determining a last requested network location for the content item based on the logged times.

15. The system of claim 14, wherein the instructions cause the data processing apparatus to perform operations further comprising:
- determining that the last requested network location for the content item does not match a network location in the set of declared network locations; and
- preventing presentation of the content item in response to determining that the last requested network location does not match a network location in the set of declared network locations.

16. The system of claim 9, wherein the instructions cause the data processing apparatus to perform operations further comprising:
- determining for a particular network location that content items provided by at least a threshold number of content item providers redirect users to the particular network location; and
- identifying the particular network location as a service location for a service site in response to determining that the content item provider by the threshold number of content item providers redirect users to the particular network location.

17. A non-transitory computer-readable medium storing computer-executable instructions that, when executed by device server system, cause the server system to perform a method of consistently delivering a web page having source code with a dynamic instruction, comprising:

receiving, from a content item provider, a set of declared network locations that the content item provider specifies are requested by a user device in response to user interaction with a content item;

simulating a user interaction with the content item including:
- rendering the content item; and
- initiating, through interaction with the content item, a request for a destination page that is linked to by the content item;

detecting one or more uniform resource locators (URLs) of servers that are contacted after the interaction with the content item, but before a landing page is retrieved by the server system;

generating, for the content item, a composite set of network locations that includes network locations of the one or more detected URLs and the set of declared network locations specified by the content item provider wherein at least one of the network locations of the one or more detected URLs differs from the set of declared network locations;

comparing the composite set of network locations to a set of blacklisted network locations provided by a publisher that differs from the content item provider; and preventing the content item from being presented with a web document provided by the publisher when a network location in the composite set of network locations matches a network location in the set of blacklisted network locations.

18. The non-transitory computer-readable medium of claim 17, wherein preventing presentation of the content item comprises not transmitting the content item in response to a content item request.

19. The non-transitory computer-readable medium of claim 17, wherein the instructions cause the server system to perform operations further comprising:
- determining that fewer than a threshold number of the detected URLs match a network location in the declared network locations; and preventing, in response to determining that fewer than a threshold number of the detected URLs match a network location in the declared network locations, presentation of the content item with publisher resources.

20. The non-transitory computer-readable medium of claim 17, wherein the instructions cause the server system to perform operations further comprising:
   determining that at least a threshold number of the detected URLs are not included in the declared network locations; and
   preventing, in response to determining that at least a threshold number of the detected URLs are not included in the declared network locations, presentation of the content item with publisher resources.

21. The non-transitory computer-readable medium of claim 17, wherein the instructions cause the server system to perform operations further comprising:
   obtaining, from a browser address field, a last requested network address for the content item, the last requested network address being a network address for a final resource that was requested in response to interaction with the content item; and
   identifying a resource at the last requested network address as a destination resource for the content item.

22. The non-transitory computer-readable medium of claim 17, wherein the instructions cause the server system to perform operations further comprising:
   logging a time at which the network locations in the one or more detected URLs were requested; and
   determining a last requested network location for the content item based on the logged times.

23. The non-transitory computer-readable medium of claim 22, wherein the instructions cause the server system to perform operations further comprising:
   determining that the last requested network location for the content item does not match a network location in the set of declared network locations; and
   preventing presentation of the content item in response to determining that the last requested network location does not match a network location in the set of declared network locations.

24. The non-transitory computer-readable medium of claim 17, wherein the instructions cause the server system to perform operations further comprising:
   determining for a particular network location that content items provided by at least a threshold number of content item providers redirect users to the particular network location; and
   identifying the particular network location as a service location for a service site in response to determining that the content item provider by the threshold number of content item providers redirect users to the particular network location.

\* \* \* \* \*